Figures 1, 2:
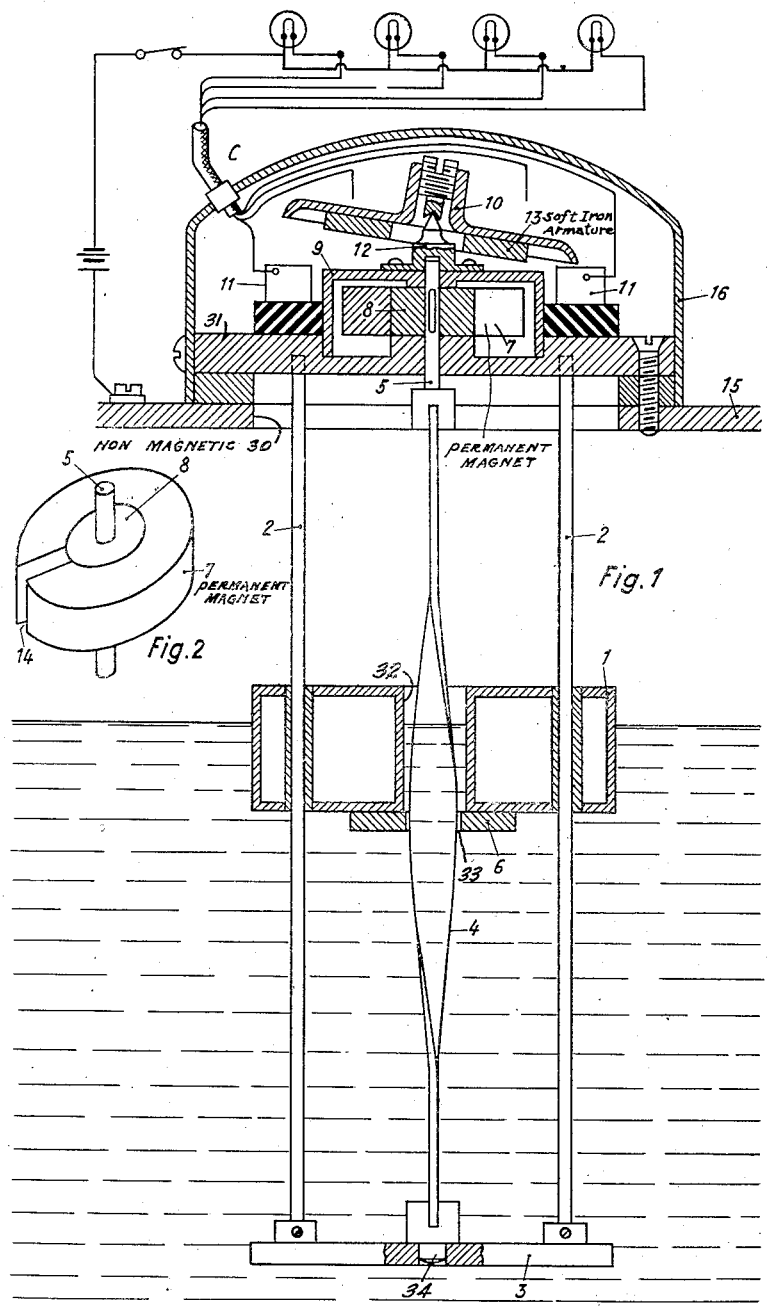

Aug. 6, 1946.  W. GRIMM  2,405,140

LIQUID LEVEL SWITCH

Filed March 1, 1945

Inventor
Walter Grimm
by Singer, Ehlert, Stern & Carlberg
Attorneys

Patented Aug. 6, 1946

2,405,140

UNITED STATES PATENT OFFICE 2,405,140

LIQUID LEVEL SWITCH

Walter Grimm, Zurich-Oerlikon, Switzerland, assignor to L. H. Kapp & Co., Zurich, Switzerland Application March 1, 1945, Serial No. 580,300

2 Claims. (Cl. 200—84)

The present invention relates to a new and improved liquid gage and more especially to a gage to be used in combination with liquid fuel containers, tanks, vessels or the like.

Gages are known in which a float within the container cooperates with an electric signalling device arranged outside the container. It has been proposed to place the electric contacting and signalling device in a closed chamber outside the tightly closed liquid container. The movements of a float inside the container are transmitted by a screw threaded spindle of very high pitch to a rotating shaft carrying a permanent magnet, which transfers its motion through a wall of non-magnetic material closing the liquid container to the electric signaliing device.

The object of the present invention consists in the provision of improved means to control signalling currents by which the levels of the liquid are shown by appropriate indicating devices.

I attain the said object by making use of a magnetic device having a tiltable member for bringing the signalling device in and out of circuit.

Other features of the invention reside in the form of the parts to transmit the motion of a float to the indicating means and in the arrangements and combinations of the various parts, all of which will be more fully described in connection with the accompanying drawing in which Fig. 1 is a sectional elevation of a form of the new gage shown in a diagrammatical manner.

Fig. 2 is a perspective view of the rotating armature.

In Fig. 1, 15 denotes a receptacle of liquid, the wall of which is provided with a hole 30 covered by a plate 31 closing tightly the receptacle 15. In the plate 31 two rods 2 are fastened running parallel to each other and interconnected at their free ends by a cross piece 3. On the two rods 2 a cylindrical float 1 is slidably mounted having a central sleeve 32. Through the latter extends a spindle 4 of rectangular cross section having a turn of 180 degrees. To the float 1 a plate 6 is fastened having a slot 33 through which the said spindle 4 passes. The lower end of spindle 4 is rotatably mounted in the cross piece 3 by a pivot 34 and the upper end thereof is fastened to a shaft 5 rotatably mounted in the plate 31. By rising or falling the float 1 will turn the spindle 4 more or less in accordance with its direction of movement or the change of the liquid level. On the plate 31 a cover 9 is fastened forming together with plate 31 a closed housing in which is arranged an aimature rigidly connected to shaft 5. The armature comprises a core 8 of a non-magnetic material and an open ring 7 of steel with slot 14. The ring 7 is a permanent magnet, the cover 9 is of non-magnetic material. On the cover 9 a pivot 12 is arranged in axial alinement with the shaft 5 on which a shallow disk 10 is rotatably and rockingly mounted. In a circle with shaft 5 as a centre a number of contact members 11 are arranged with each of which the rim of disk 10 may make contact. On the lower face of the disk 10 a ring 13 of soft iron is fastened acting as an armature. According to the position of the float 1 the shaft 5 and therewith the ring 7 will be turned and the gap 14 in the ring 7 will cause the disk 10 to be rocked by turning on its pivot point, contacting with someone of the posts 11. The latter form parts of circuits C with signaling instruments such as lamps for signalling the levels of the liquid within the container 15. The contact device is covered by a cap 16.

Although I have shown a preferred construction of my new liquid gage, I would point out that various changes in the form and construction of the parts of the gage may be made without departing from the spirit of my invention.

What I claim and wish to secure by Letters Patent is:

1. In a liquid level gage, the combination with a float mechanism in which a float rotates a vertical spindle when the level of the liquid changes, of a contact device for controlling signalling circuits, said contact device including within means forming a closed housing, a vertical rotatable shaft, an annular permanent magnet provided with a radial slot, and means for fixedly attaching said permanent magnet concentrically to said shaft; a pivot being arranged in axial alinement with said shaft on the outside of said housing, an electrically grounded circular disc rotatably and tiltably supported by said pivot and carrying an annular magnetizable disc in opposition to said permanent magnet, a series of electrically insulated contact members arranged concentrically about the axis of said pivot and adapted to be engaged successively by the circumference of said circular disc when the latter is tilted and when said permanent magnet is rotated, thereby closing the signalling circuits to which the respective contact members are connected, the lower end of said shaft projecting from said housing, and means operatively connecting said lower end of said shaft to the upper end of said vertical spindle.

2. In a liquid level gage, the combination with a float mechanism in which a float rotates a vertical spindle when the level of the liquid changes, of a contact device for controlling signalling circuits, said contact device including a vertical rotatable shaft, an annular permanent magnet having a radial slot concentrically attached to said shaft, means for operatively connecting the lower end of said shaft with the upper end of said spindle, an electrically grounded circular contact disc, means for rotatably and tiltably supporting said disc above said permanent magnet in axial alinement with said shaft, an annular magnetizable disc secured to said circular contact disc and arranged opposite said annular permanent magnet, and a series of electrically insulated contact members arranged concentrically about the axis of said shaft and adapted to be engaged successively by the circumference of said contact disc when the latter is tilted and when said permanent magnet is rotated, thereby closing the signalling circuits to which the respective contact members are connected.

WALTER GRIMM.